(12) United States Patent
Sigler et al.

(10) Patent No.: US 9,987,705 B2
(45) Date of Patent: Jun. 5, 2018

(54) RESISTANCE SPOT WELDING OF STEEL TO PRE-COATED ALUMINUM

(71) Applicant: GM Global Technology Operations LLC, Detroit, MI (US)

(72) Inventors: David R. Sigler, Shelby Township, MI (US); Blair E. Carlson, Ann Arbor, MI (US); Mahmoud H. Abd Elhamid, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 903 days.

(21) Appl. No.: 14/268,422

(22) Filed: May 2, 2014

(65) Prior Publication Data

US 2014/0360986 A1   Dec. 11, 2014

Related U.S. Application Data

(60) Provisional application No. 61/832,482, filed on Jun. 7, 2013.

(51) Int. Cl.
*B23K 11/10* (2006.01)
*B23K 11/34* (2006.01)
*B23K 11/11* (2006.01)
*B23K 103/20* (2006.01)

(52) U.S. Cl.
CPC .............. *B23K 11/34* (2013.01); *B23K 11/115* (2013.01); *B23K 2203/20* (2013.01)

(58) Field of Classification Search
CPC ....... B23K 11/115; B23K 11/20; B23K 11/36; B23K 2203/04; B23K 2203/05; B23K 2203/10

USPC ............. 219/112.14, 121.64, 118, 117.1, 74, 219/78.01, 86.1, 91.2, 93–94; 428/653, 428/683, 573, 594
See application file for complete search history.

(56) References Cited

U.S. PATENT DOCUMENTS

| 3,391,033 A | * | 7/1968 | Chevigny | .............. B23K 35/40 134/28 |
| 5,783,794 A | | 7/1998 | Oikawa et al. | |
| 7,850,059 B2 | | 12/2010 | Kobayashi et al. | |

(Continued)

FOREIGN PATENT DOCUMENTS

| EP | 1987904 A1 | 11/2008 |
| JP | 11342477 | 12/1999 |
| JP | 2005152958 A | 6/2005 |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Phuong Nguyen
(74) *Attorney, Agent, or Firm* — Reising Ethington P.C.

(57) ABSTRACT

Resistance spot welding of a steel workpiece to an aluminum or an aluminum alloy workpiece can be facilitated by replacing the refractory aluminum oxide-based layer(s) on at least the faying surface of the aluminum or aluminum alloy workpiece with a protective coating that is more conducive to the spot welding process. The protective coating may be a metallic coating or a metal oxide conversion coating. In a preferred embodiment, the protective coating is a coating of zinc, tin, or an oxide of titanium, zirconium, chromium, or silicon.

17 Claims, 5 Drawing Sheets

(56) References Cited

U.S. PATENT DOCUMENTS

| | | | |
|---|---|---|---|
| 7,935,908 B2 | 5/2011 | Nakagawa et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |
| 8,487,206 B2 | 7/2013 | Urushihara et al. | |
| 8,541,110 B2 | 9/2013 | Chen et al. | |
| 2005/0218121 A1* | 10/2005 | Hayashi | B23K 11/20 219/118 |
| 2008/0076267 A1* | 3/2008 | Oishi | B23K 26/0613 438/785 |
| 2008/0102308 A1 | 5/2008 | Doira et al. | |
| 2013/0189023 A1 | 7/2013 | Spinella | |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Yang et al., U.S. Appl. No. 14/181,020 entitled "Electrode for Resistance Spot Welding of Dissimilar Metals,", filed Feb. 14, 2014.

Yang et al., U.S. Appl. No. 14/181,955 entitled "Resistance Spot Welding Steel and Aluminum Workpieces with Protuberance,", filed Feb. 17, 2014.

Sigler et al., U.S. Appl. No. 14/268,422 entitled "Resistance Spot Welding of Steel to Pre-Coated Aluminum,", filed May 2, 2014.

Sigler et al., U.S. Appl. No. 14/462,655 entitled "Resistance Spot Welding Steel and Aluminum Workpieces Using Electrode Weld Face Cover,", filed Aug. 19, 2014.

Sigler et al, U.S. Appl. No. 14/464,476 entitled "Multi-Step Direct Welding of an Aluminum-Based Workpiece to a Steel Workpiece,", filed Aug. 20, 2014.

Schroth et al., U.S. Appl. No. 14/488,799 entitled "Resistance Spot Welding Steel and Aluminum Workpieces with Hot Welding Electrode at Aluminum Workpiece,", filed Sep. 17, 2014.

Carlson et al, U.S. Appl. No. 14/503,504 entitled "Resistance Spot Welding Steel and Aluminum Workpieces Using Insertable Cover,", filed Oct. 1, 2014.

Sigler et al., U.S. Appl. No. 14/503,969 entitled "Aluminum Alloy to Steel Welding Process,", filed Oct. 1, 2014.

Wang et al, U.S. Appl. No. 14/561,746 entitled "Resistance Spot Welding Steel and Aluminum Workpieces with Electrode Insert,", filed Dec. 5, 2014.

\* cited by examiner

RESISTANCE SPOT WELDING OF STEEL TO PRE-COATED ALUMINUM

This application claims the benefit of U.S. provisional patent application No. 61/832,482, filed on Jun. 7, 2013, the entire contents of which are hereby incorporated by reference.

TECHNICAL FIELD

The technical field of this disclosure relates generally to resistance spot welding and, more particularly, to resistance spot welding a steel workpiece to an aluminum or an aluminum alloy workpiece.

BACKGROUND

Resistance spot welding is a process used by a number of industries to join together two or more metal workpieces. The automotive industry, for example, often uses resistance spot welding to join together pre-fabricated metal workpieces during the manufacture of a vehicle door, hood, trunk lid, or lift gate, among others. A number of spot welds are typically formed along a peripheral edge of the metal workpieces or some other bonding region to ensure the part is structurally sound. While spot welding has typically been practiced to join together certain similarly-composed metal workpieces—such as steel-to-steel and aluminum alloy-to-aluminum alloy—the desire to incorporate lighter weight materials into a vehicle body structure has generated interest in joining steel workpieces to aluminum or aluminum alloy (hereafter collectively referred to as "aluminum" for brevity) workpieces by resistance spot welding.

Resistance spot welding, in general, relies on the resistance to the flow of an electrical current through contacting metal workpieces and across their faying interface to generate heat. To carry out such a welding process, a pair of opposed spot welding electrodes are typically clamped at diametrically aligned spots on opposite sides of the workpieces at a predetermined weld site. An electrical current is then passed through the metal workpieces from one electrode to the other. Resistance to the flow of this electrical current generates heat within the metal workpieces and at their faying interface. When the metal workpieces being welded are a steel workpiece and an aluminum workpiece, the heat generated at the faying interface initiates a molten weld pool in the aluminum alloy workpiece. This molten aluminum alloy weld pool wets the adjacent surface of the steel workpiece and, upon stoppage of the current flow, solidifies into a weld joint. After the spot welding process has been completed, the welding electrodes are retracted from their respective workpiece surfaces, and the spot welding process is repeated at another weld site.

Spot welding a steel workpiece to an aluminum workpiece presents some challenges. These two types of metals have several considerable dissimilarities that tend to disrupt the welding process. For one, steel has a relatively high melting point (~1500° C.) and a relatively high resistivity, while aluminum has a relatively low melting point (~600° C.) and a relatively low resistivity. As a result of these physical differences, aluminum melts more quickly and at a much lower temperature than steel during current flow. Aluminum also cools down more quickly than steel after current flow has been terminated. Thus, immediately after the welding current stops, a situation occurs where heat is sustained in the steel workpiece and ultimately conducted through the aluminum workpiece towards the electrode on the aluminum workpiece side. A sustained elevated temperature in the steel workpiece and the development of steep thermal gradients between the two workpieces is conducive to the growth of brittle Fe—Al intermetallic compounds at the faying interface. Fe—Al intermetallic compounds, in turn, can reduce the strength and ductility of the weld joint if their growth is excessive.

Another notable dissimilarity between the two metals is that aluminum contains one or more refractory oxide layers (hereafter collectively referred to as a single oxide layer for brevity) on its surface that are created during mill operations (e.g., annealing, solution treatment, casting, etc.) and environmental exposure. This oxide layer, which is composed primarily of aluminum oxides, is electrically insulating, mechanically tough, and self-healing in air. Such characteristics are not conducive to the mechanics of spot welding a steel workpiece to an aluminum workpiece. Specifically, the surface oxide layer raises the electrical contact resistance of an aluminum workpiece—namely, at its faying surface and electrode/workpiece contact interface—thus causing excessive heat to be generated at those interfaces making it difficult to effectively concentrate heat within the aluminum workpiece. The mechanical toughness of the surface oxide layer also inhibits wetting of the steel workpiece. Moreover, the problems posed by the refractory oxide layer on the surface of the aluminum workpiece are further complicated by the fact that the oxide layer can self-heal or regenerate if breached in the presence of oxygen.

SUMMARY OF THE DISCLOSURE

The ability to resistance spot weld a steel workpiece and an aluminum workpiece is enhanced by replacing at least the refractory aluminum oxide-based layer on the faying surface of the aluminum workpiece with a different, protective coating. The substituted protective coating may be a metallic coating that has a lower melting point than that of aluminum (the metal), or it may be a metal oxide conversion coating. Examples of metals that can be employed to make a metallic coating are zinc and tin. Examples of metal oxides that can be found in a metal oxide conversion coating are oxides of titanium, zirconium, chromium, or silicon. The protective coating may be anywhere from about 1 nm to about 10 µm thick depending on the coating type.

The protective coating protects the underlying aluminum from reacting with oxygen in air to regenerate its naturally-formed refractory aluminum oxide-based layer. It is also less disruptive to the spot welding process than the aluminum oxide-based layer it replaces, which promotes the formation of a stronger weld between the workpieces. In particular, compared to the refractory aluminum oxide-based layer, the protective coating is more electrically conductive and easier to melt or breakdown under the thermal and mechanical stresses imparted by the spot welding process. Such properties of the protective coating make it easier for a molten aluminum alloy weld pool to make direct contact with, and wet, an adjacent portion of the steel workpiece.

A preferred method of joining a steel workpiece to an aluminum workpiece by resistance spot welding begins by replacing, with the protective coating, at least the standard aluminum-oxide based layer at the faying surface of the aluminum workpiece where welding current is intended to pass. This can be accomplished by any suitable technique that results in the formation of the particular protective coating desired (e.g., metallic or metal oxide conversion). The steel workpiece and the aluminum workpiece are then assembled into a workpiece stack-up and located relative to a welding gun that carries a pair of opposed spot welding electrodes. Next, the spot welding electrodes are pressed against opposite sides of the stack-up—one against the steel workpiece and one against the aluminum workpiece—and a welding current is passed between them.

During current flow, the protective coating at the faying surface of the aluminum workpiece melts or breaks down to allow the molten aluminum alloy weld pool to make direct contact with the steel at the weld site. After stoppage of the welding current flow, a weld joint forms that metallurgically joins the steel workpiece and the aluminum workpiece together. The weld joint includes an aluminum alloy nugget that extends into the aluminum workpiece and an intermetallic layer between the aluminum alloy nugget and the steel workpiece. The intermetallic layer comprises iron-aluminum ("Fe—Al") intermetallics and is thin enough to maintain quality weld strength between the two workpieces. Having the capacity to maintain such a thin intermetallic layer is due at least in part to the presence of the protective coating on the faying surface of the aluminum workpiece and the consequential absence of the refractory aluminum-oxide based layer that would otherwise be present.

DETAILED DESCRIPTION

Figure 1:
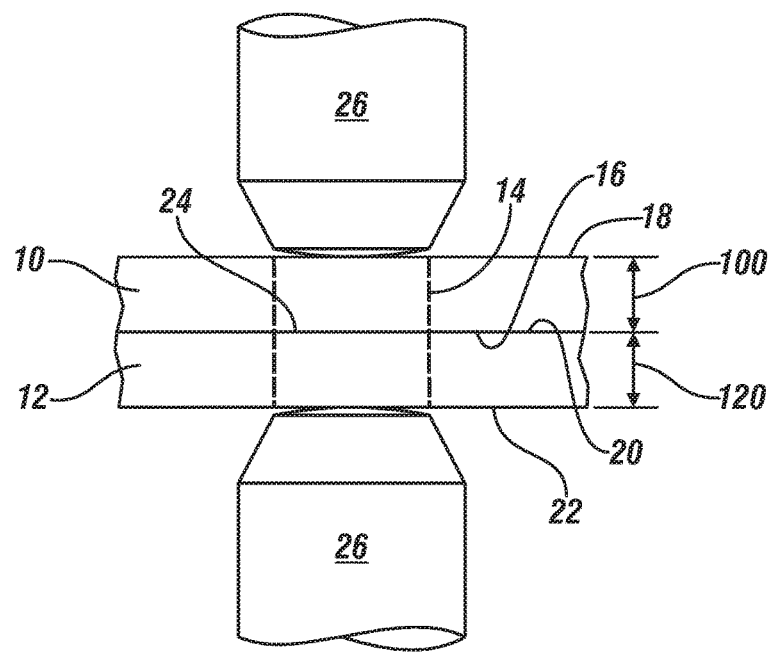
FIG. 1 is a side elevational view of a workpiece stack-up that includes a steel workpiece and an aluminum workpiece and which is situated between a pair of opposed spot welding electrodes.
Figure 2:
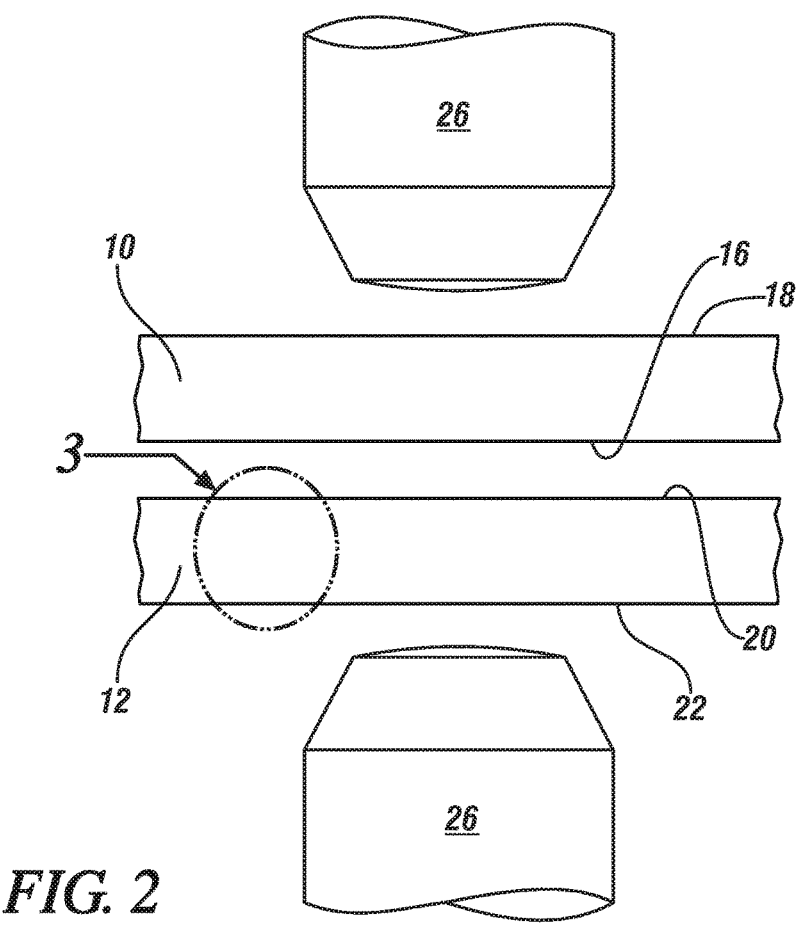
FIG. 2 is an exploded view of the workpiece stack-up and the opposed spot welding electrodes shown in FIG. 1.
Figure 3:
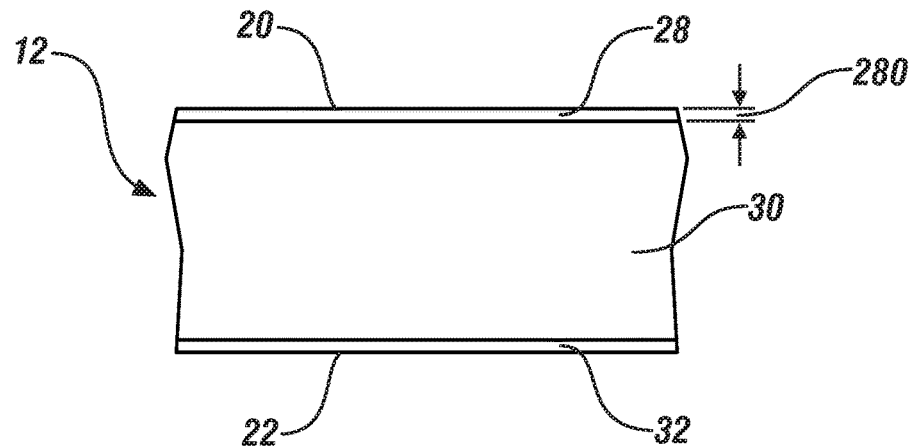
FIG. 3 is a partial magnified view of the aluminum workpiece depicted in FIG. 2.

FIGS. 1-3 generally depict a steel workpiece 10 and an aluminum workpiece 12 that are assembled for resistance spot welding at a predetermined weld site 14. The steel workpiece 10 is preferably a galvanized, or zinc-coated, low carbon steel. Other types of steel workpieces may of course be used including, for example, a low carbon steel or a galvanized advanced high strength steel (AHSS). Some specific types of steels that may be used in the steel workpiece 10 are interstitial-free (IF) steel, dual-phase (DP) steel, transformation-induced plasticity (TRIP) steel, and press-hardened steel (PHS). Regarding the aluminum workpiece 12, it may include an aluminum-magnesium alloy, an aluminum-silicon alloy, an aluminum-magnesium-silicon alloy, an aluminum-zinc alloy, or aluminum metal. Some specific aluminum alloys that may be used in the aluminum workpiece 12 are AA5754 aluminum-magnesium alloy, AA6022 aluminum-magnesium-silicon alloy, and AA7003 aluminum-zinc alloy. The term "workpiece" and its steel and aluminum variations is used broadly in the present disclosure to refer to a sheet metal layer, a casting, an extrusion, or any other piece that is resistance spot weldable, including any surface layers or coatings, if present.

When stacked-up for spot welding, the steel workpiece 10 includes a faying surface 16 and an electrode-contacting surface 18. Likewise, the aluminum workpiece 12 includes a faying surface 20 and an electrode-contacting surface 22. The faying surfaces 16, 20 of the two workpieces 10, 12 overlap and confront one another, and preferably make direct contact, to provide a faying interface 24 at the weld site 14. The electrode-contacting surfaces 18, 22 of the steel and aluminum workpieces 10, 12 generally face away from each other in opposite directions to make them accessible by a pair of opposed spot welding electrodes 26. Each of the steel and aluminum workpieces 10, 12 preferably has a thickness 100, 120 that ranges from about 0.3 mm to about 6.0 mm, and more preferably from about 0.5 mm to about 4.0 mm, at the weld site 14. During spot welding, as will be further described below, a weld joint 92 (FIG. 9) is formed at the faying interface 24 that metallurgically joins the steel and aluminum workpieces 10, 12 together.

The aluminum workpiece 12 is prepared for spot welding by replacing its standard refractory aluminum oxide-based layer with another, different protective coating 28 at least at the faying surface 20 (shown best in FIG. 3) where current is intended to pass during spot welding. The protective coating 28 may be a metallic coating that has a lower melting point than aluminum. Some notable examples of metals that can be employed to make such a coating are zinc and tin. The protective coating 28 may also be a metal oxide conversion coating. Some notable examples of metal oxides that can be found in such a coating are oxides of titanium, zirconium, chromium, or silicon. Depending on the coating type, a thickness 280 of the protective coating 28 can range anywhere from about 1 nm to about 10 μm. For example, an acceptable thickness for a metallic coating is about 10 nm to about 10 μm, and an acceptable thickness for a metal oxide conversion coating is about 1 nm to about 100 nm.

The protective coating 28 protects a bulk underlying aluminum base substrate 30 from reacting with oxygen to regenerate its standard refractory aluminum oxide-based layer. It is also more electrically conductive and easier to melt or breakdown under the thermal and mechanical stresses imparted by the spot welding process, as compared to the refractory aluminum oxide-based layer typically found on an aluminum surface, thus allowing a molten aluminum alloy weld pool that is formed in the aluminum base substrate 30 during spot welding to be more accessible at the weld site 14. If the protective coating 28 is a metallic coating of zinc or tin, for example, the coating 28 will melt early in the weld schedule. If, on the other hand, the protective coating 28 is a metal oxide conversion coating, it will fracture and disintegrate under the thermal and mechanical stress associated with the spot welding process, also early in the weld schedule. Additionally, once the protective coating 28 is removed during spot welding, it will not regenerate since it does not have the ability to self-heal like the naturally-formed aluminum oxide-based layer that it replaced. While the protective coating 28 has just been described as being present at the faying surface 20 of the aluminum workpiece 12, it should be appreciated that a protective coating 32 of similar construction may also be present—and indeed is preferably present—at the electrode-contacting surface 22 where electrode engagement occurs.

The presence of the protective coating 28 at the faying surface 20 promotes the direct exposure of aluminum to steel in and around the area where current passes during spot welding. Such intimate exposure between the steel and aluminum is believed to foster a stronger weld joint 92 between the two workpieces 10, 12 for several reasons. First, the absence of the refractory aluminum oxide-based layer permits more rapid and complete wetting of the steel by molten aluminum. And when the steel workpiece 10 is a galvanized steel workpiece, the ease with which the protective coating 28 melts or disintegrates allows the galvanized zinc coating on the steel workpiece 10 to be readily absorbed by, and alloyed with, the molten aluminum alloy weld pool that is initiated in the aluminum workpiece 12, which further promotes wetting. Second, the ability to better wet the steel workpiece 10 allows a shorter weld schedule to be used. Third, the absence of the refractory aluminum oxide-based layer reduces heat generation at the faying interface 24, which favors improved joint strength by limiting the formation and growth of Fe—Al intermetallic compounds. Lastly, the combination of a shorter weld schedule and reduced heat generation at the faying interface 24 limits the accumulation of heat in the steel workpiece, meaning that the weld site 14 cools at a faster rate and damage to the surrounding metal within the heat-effected zone is minimized.

Figure 4:
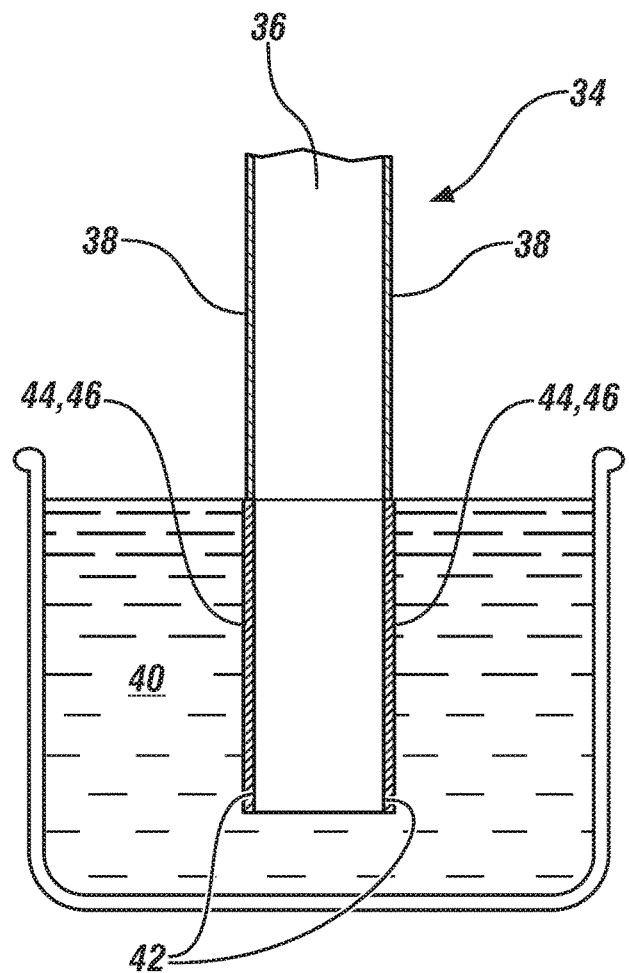
FIG. 4 is a schematic representation of one embodiment of a process for substituting a protective coating for the refractory aluminum oxide-based layer present on the surface of an aluminum workpiece.

The protective coating 28 can be substituted for the standard refractory aluminum oxide-based layer in any suitable way. To employ a coating of zinc as the protective coating 28, for example, a zincification process may be practiced. To demonstrate this process, and referring now to FIG. 4, an aluminum workpiece 34 that includes a bulk aluminum base substrate 36 and a refractory aluminum oxide-based layer 38 overlying the aluminum base substrate 36 is preferably immersed in an alkaline solution 40 that includes sodium zincate. The refractory aluminum oxide-based layer 38 is unstable and dissolves in such a solution to leave behind a reactive surface 42 of the aluminum base substrate 36 that is bare or includes only a very thin refractory aluminum oxide-based layer 38 that cannot protect the aluminum base substrate 36 against further oxidation or other chemical reaction activity. This reactive aluminum surface 42 is quickly plated with a coating of zinc 44, which has a preferred thickness of about 10 nm to about 2 μm, and which is derived from zincate anions [$Zn(OH)_4^{2-}$] that exist in the alkaline solution 40 according to the following reactions:

  (1)

  (2)

The protective coating 28 can be formed as a coating of tin in a similar way. In particular, and still referring to FIG. 4, the aluminum workpiece 34 is again preferably immersed in the alkaline solution 40, which in this instance includes sodium stannate. And, like before, the refractory oxide layer 38 is unstable and dissolves in the alkaline solution 40 to leave behind the reactive surface 42 of the aluminum base substrate 36. The reactive aluminum surface 42 is then quickly plated with a coating of tin 46, which has a preferred thickness of about 10 nm to about 2 μm, and which is derived from hexavalent stannate anions [$Sn(OH)_6^{2-}$] that exist in the alkaline solution 40 according to the following reaction:

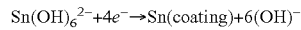

Figure 5:
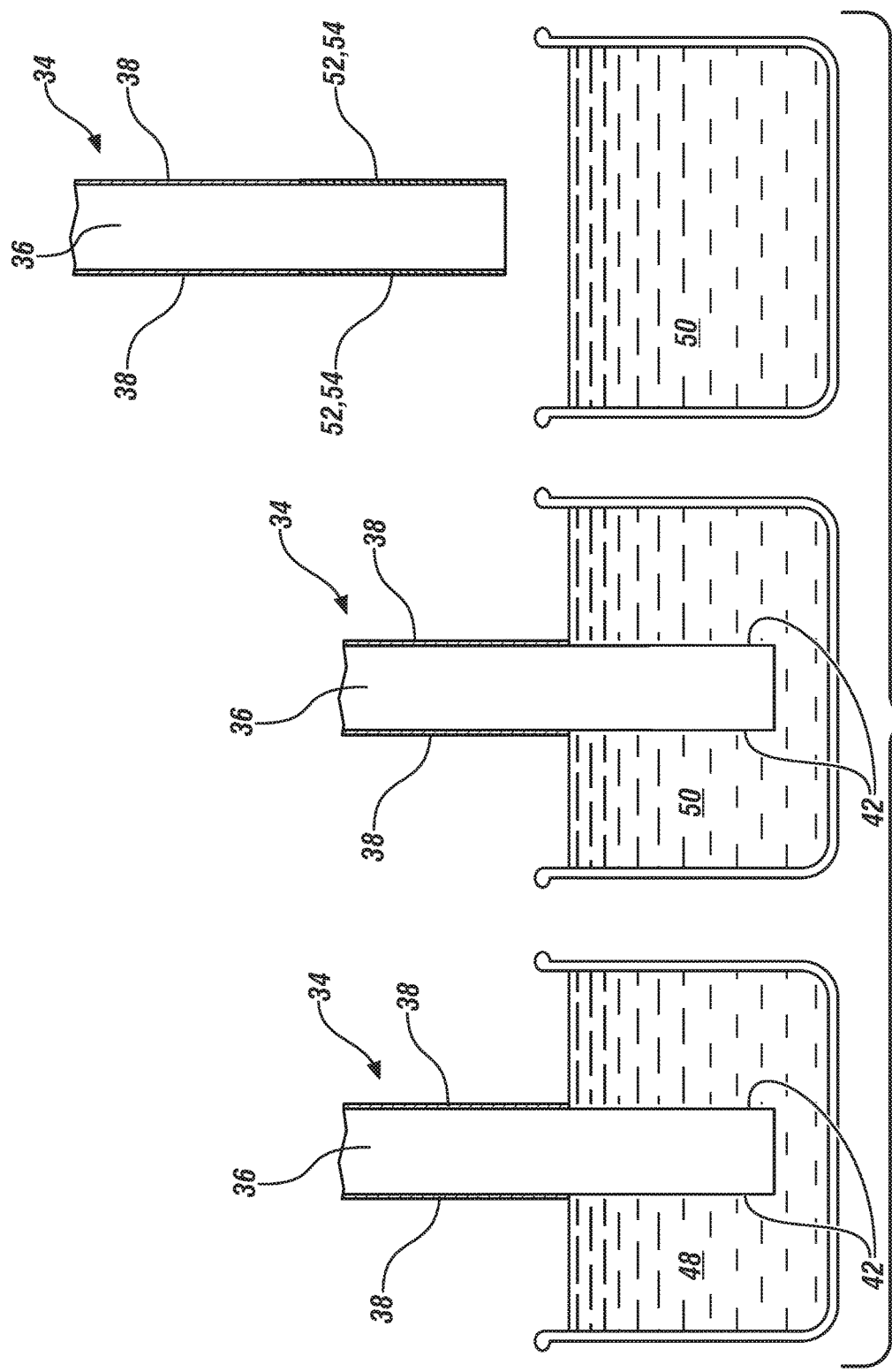
FIG. 5 is a schematic representation of another embodiment of a process for substituting a protective coating for the refractory aluminum oxide-based layer present on the surface of an aluminum workpiece.

The protective coating 28 can be formed as a coating of titanium oxide (also commonly referred to as titanate) by a slightly different process, as shown generally in FIG. 5. To make such a coating, the aluminum workpiece 34 is preferably first immersed in a solution 48 that can thin or altogether remove the refractory aluminum oxide-based layer 38. One of sodium hydroxide or hydrofluoric acid, for example, is able to dissolve the refractory oxide layer 38 and to leave behind the reactive surface 42 of the aluminum base substrate 36, which can be bare aluminum or include a very thin refractory aluminum oxide-based layer that cannot protect the aluminum base substrate 36 against further oxidation or other chemical reaction activity. Next, the aluminum workpiece 34 is immersed in a solution 50 that includes a reactive organometallic titanium compound. The reactive organometallic titanium compound may be titanium isopropoxide or titanium ethoxide, for example, each of which is preferably dissolved in a low-boiling point organic solvent, such as n-hexane, to isolate the titanium compound from the humidity in air. Upon removing the aluminum workpiece 34 from the solution 50, the low-boiling point organic solvent evaporates and the reactive organometallic titanium compound reacts with humidity (i.e., water) in air to form a conformable coating of titanium oxide 52 on the surface 42 of the aluminum base 36. The titanium oxide coating 52 has a preferred thickness of about 1 nm to about 50 nm and, more preferably, from about 1 nm to about 20 nm. The following reactions provide further detail on how the titanium oxide coating 52 is formed, in which "R" represents the organo group (e.g., isopropoxide, ethoxide, etc.) of the reactive organometallic titanium compounds:

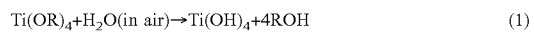  (1)

  (2)

A zirconium oxide coating is also preferably formed in the same general way as a titanium oxide coating. That is, the aluminum workpiece 34 is first immersed in the solution 48 to thin or altogether remove the refractory aluminum oxide-based layer 38 and, afterwards, is immersed in the solution 50 which, in this embodiment, includes a reactive organometallic zirconium compound. Here, the solution 50 preferably includes zirconium (IV) ethoxide and/or zirconium (IV) isopropoxide dissolved in a low-boiling point organic solvent such as n-hexane. Upon removing the aluminum workpiece 34 from solution 50, the low-boiling point organic solvent evaporates and the reactive organometallic zirconium compound reacts with humidity (i.e., water) in air to form a conformable coating of zirconium oxide 54 on the surface 42 of the bulk aluminum base substrate 36. The zirconium oxide coating 54 has a preferred thickness of about 1 nm to about 50 nm and, more preferably, from about 1 nm to about 20 nm.

Figure 6:
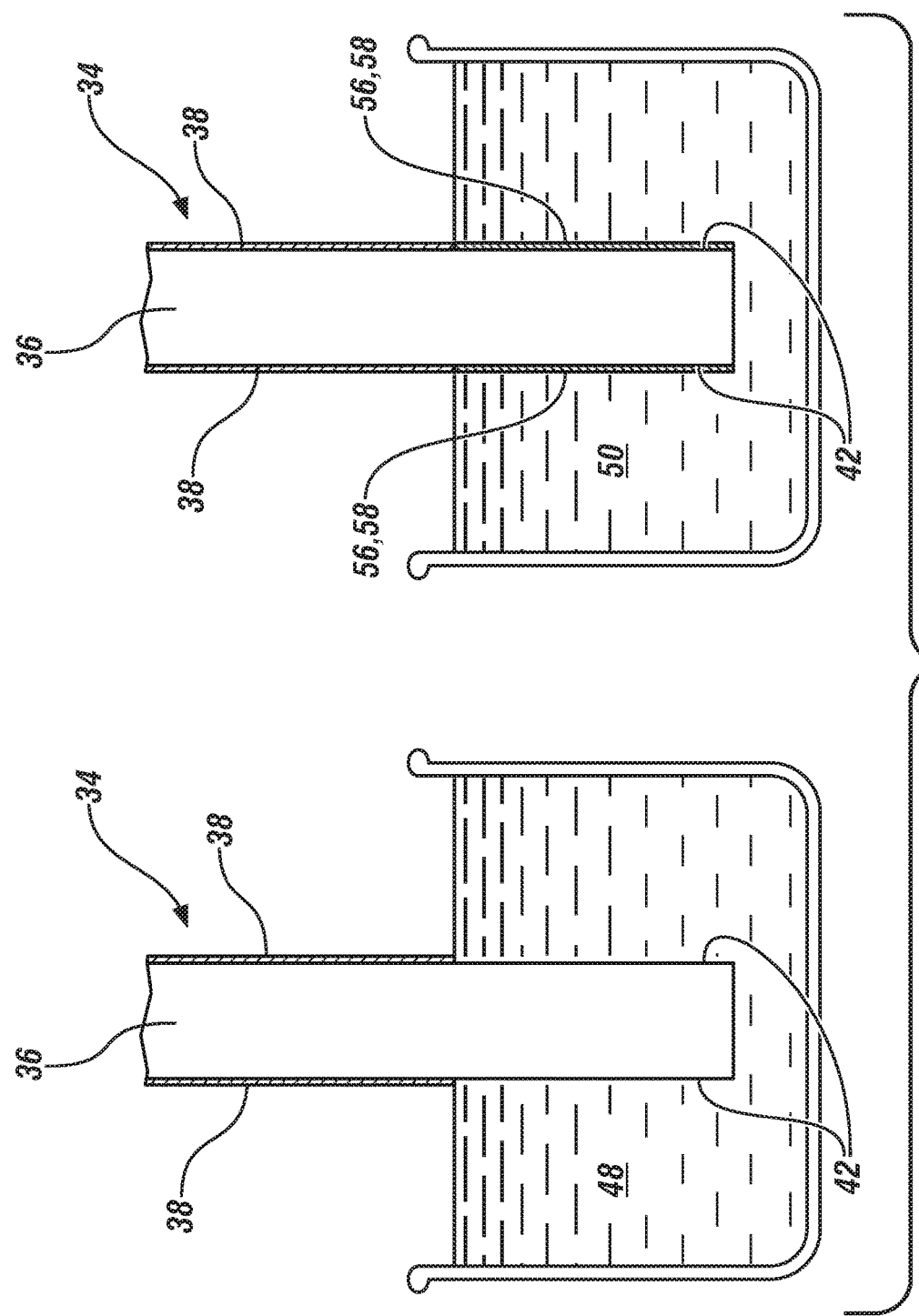
FIG. 6 is a schematic representation of yet another embodiment of a process for substituting a protective coating for the refractory aluminum oxide-based layer present on the surface of an aluminum workpiece.

The protective coating 28 can be formed of chromium oxide or silicon oxide in a slightly different way than it can be formed from titanium oxide or zirconium oxide. To form a chromium oxide coating, for example, as shown in FIG. 6, the aluminum workpiece 34 is preferably first immersed in the solution 48 to thin or altogether remove the refractory aluminum oxide-based layer 38, as before. The aluminum workpiece 34 is then immersed in the solution 50 which, in this embodiment, includes a reactive chromium compound.

Several suitable reactive chromium compounds include chromic acid or a chromium salt including a chromate and/or a dichromate such as, for example, potassium chromate or potassium dichromate, respectively. In slight contrast to before with titanium oxide and zirconium oxide, an insoluble chromium oxide coating 56 precipitates on the reactive aluminum surface 42 while the aluminum workpiece 34 is immersed in the solution 50. The chromium oxide coating 56 has a preferred thickness of about 1 nm to about 50 nm and, more preferably, from about 1 nm to about 20 nm.

A silicon oxide coating is preferably formed in the same general way as the chromium oxide coating. First, and still referring to FIG. 6, the aluminum workpiece 34 is immersed in the solution 48 to thin or altogether remove the refractory aluminum oxide-based layer 38. The aluminum workpiece 34 is then immersed in the solution 50 which, in this embodiment, now includes a reactive silicon dioxide compound. The reactive silicon dioxide compound is preferably hydrated silicon dioxide particles. These particles can be made available in the solution 50 by dissolving an organosilicon compound, such as tetraethyl orthosilicate (TEOS), in a solvent that facilitates hydrolysis of TEOS into hydrated silicon dioxide. One type of solvent that can hydrolyze TEOS is hydrochloric acid. When the cleaned aluminum workpiece 34 is immersed in the solution 50, the hydrated silicon dioxide particles deposit onto the reactive aluminum surface 42 directly and/or by replacing the aluminum contained in whatever residual amounts of the aluminum oxide layer 38 may still remain. The resultant silicon oxide coating 58 has a preferred thickness of about 1 nm to about 50 nm and, more preferably, from about 1 nm to about 20 nm.

Figure 7:
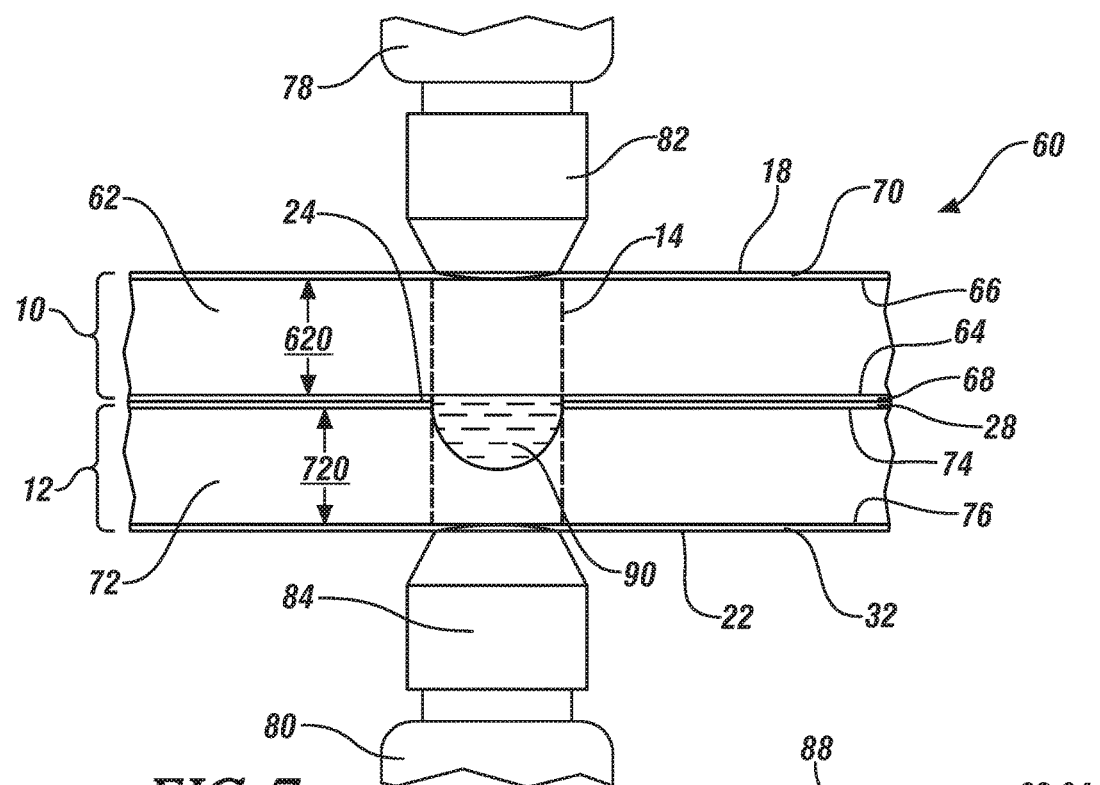
FIG. 7 is a cross-sectional view of a workpiece stack-up that includes a steel workpiece and an aluminum workpiece during spot welding of the two workpieces.
Figure 8:
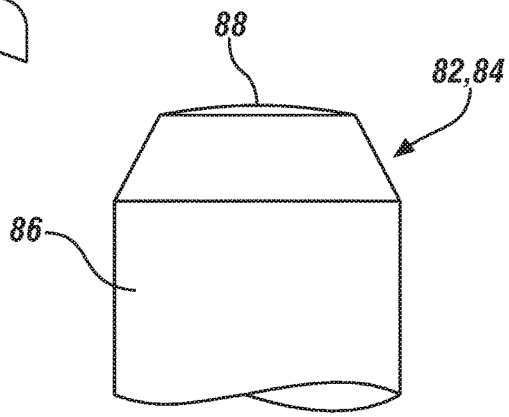
FIG. 8 is a side elevational view of spot welding electrode that includes a body and a weld face at one end of the body.
Figure 9:
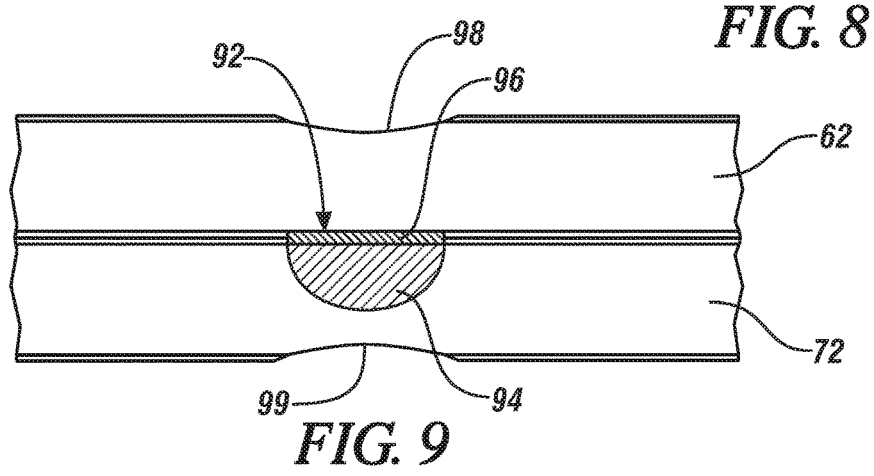
FIG. 9 is a cross-sectional view of a steel workpiece and an aluminum workpiece that have been spot welded together.

A preferred embodiment of a spot welding process in accordance with the above discussion is illustrated for the stack-up 60 shown generally in FIGS. 7-9. There, the steel workpiece 10 is a low carbon galvanized steel workpiece and the aluminum workpiece 12 is an aluminum alloy workpiece. The galvanized steel workpiece 10 includes a bulk low carbon steel base substrate 62 covered on an interior side 64 and an exterior side 66 by a zinc coating 68, 70. The low carbon steel base substrate 62 has a thickness 620 of about 0.5 mm to about 3.0 mm, and each zinc coating 68, 70 is about 2 μm to about 16 μm thick. The aluminum workpiece 12 to which the steel workpiece 10 is spot welded includes a bulk aluminum alloy base substrate 72 and the protective coatings 28, 32 described above on each of an interior side 74 and an exterior side 76. The aluminum alloy base substrate 72 has a thickness 720 of about 0.5 mm to about 4.0 mm. And each protective coating 28, 30 is preferably about 10 nm to about 2 μm thick for a metallic coating or about 1 nm to about 20 nm thick for a metal oxide conversion coating.

A cross-sectional view of the stack-up 60 thus includes the following components beginning from the electrode-contacting surface 18 of the galvanized steel workpiece 10 and ending at the electrode-contacting surface 22 of the aluminum workpiece 12: the zinc coating 70 overlying the exterior side 66 of the steel base substrate 62, the steel base substrate 62, the zinc coating 68 overlying the interior side 64 of the steel base substrate 62, the protective coating 28 overlying the interior side 74 of the aluminum alloy base substrate 72, the aluminum alloy base substrate 72, and the protective coating 32 overlying the exterior side 76 of the aluminum alloy base substrate 72. Here, the zinc coating 68 overlying the interior side 64 of the steel base substrate 62 and the corresponding protective coating 28 on the aluminum alloy base substrate 72 establish the faying interface 24 between the two workpieces 10, 12 before welding is commenced. And as explained above, the presence of the protective coating 28 at the faying interface 24 is more conducive to spot welding than the electrically insulating, mechanically tough, refractory aluminum oxide-based layer that it was substituted for.

The steel and aluminum workpieces 10, 12 can be spot welded together in accordance with conventional spot welding practices. A welding gun (partially shown) provides the electrical current needed to spot weld the steel workpiece 10 to the aluminum workpiece 12. Here, the ends of a first gun arm 78 and a second gun arm 80 that constitute part of the welding gun are shown. The first gun arm 78 carries a first welding electrode 82 and the second gun arm 80 carries a second welding electrode 84, each of which has suitable mechanical and electrical properties. The gun arms 78, 80 may be stationary (pedestal welder) or robotically moveable, as is customary in the art, and are operated during spot welding to press the welding electrodes 82, 84 against the oppositely-facing electrode-contacting surfaces 18, 22 of the steel and aluminum workpieces 10, 12 in diametric alignment with one another at the weld site 14. The clamping force assessed by the gun arms 78, 80 helps establish good mechanical and electrical contact between the welding electrodes 82, 84 and their respective electrode-contacting surfaces 18, 22.

The first and second welding electrodes 82, 84 are preferably water-cooled copper alloy welding electrodes that include a body 86 and a weld face 88 at one end of the body 86, as illustrated in FIG. 8. The weld face 88 is the part of the electrode 82, 84 that makes contact with the electrode-contacting surface 18, 22 of its designated workpiece 10, 12. Any suitable weld face design may be employed on each welding electrode 82, 84. For example, the welding electrode 84 that engages the aluminum workpiece 12 preferably includes a domed weld face, as shown specifically in FIG. 8, and may further be smooth, textured, or have surface features such as protruding ringed ridges. Some examples of these types of copper alloy welding electrodes are described in U.S. Pat. Nos. 6,861,609, 8,222,560, and 8,274,010, 8,436,269, and 8,525,066, and U.S. Patent Application Publication No. 2009/0255908. The welding electrode 82 that engages the steel workpiece 10 preferably includes a flat or domed weld face with a smooth surface as is well understood in the art.

The resistance spot welding process begins by locating the stack-up 60 between the first and second welding electrodes 82, 84 so that the weld site 14 is generally aligned with the opposed weld faces 88. The workpiece stack-up 60 may be brought to such a location, as is often the case when the gun arms 78, 80 are part of a stationary pedestal welder, or the gun arms 78, 80 may be robotically moved to locate the electrodes 82, 84 relative to the weld site 14. Once the stack-up 60 is properly located, the first and second gun arms 78, 80 converge to press the weld faces 88 of the first and second welding electrodes 82, 84 against the oppositely-facing electrode-contacting surfaces 18, 22 of the steel and aluminum workpieces 10, 12 at the weld site 14, as shown in FIG. 7.

The welding current—typically a DC current between about 5 kA and about 50 kA—is then passed between the first and second welding electrodes 82, 84 and through the stack-up 60 at the weld site 14. Resistance to the flow of the welding current through the workpieces 10, 12 initially causes the steel base substrate 62 to heat up more quickly than the aluminum alloy base substrate 72 since it has a higher resistivity. This heat imbalance causes a temperature gradient to materialize from the steel base substrate 62 to the aluminum alloy base substrate 72. The flow of heat down the temperature gradient, in conjunction with the generated heat that results from the resistance to the flow of the welding current across the faying interface 24, eventually melts the zinc coating 68 (zinc has a melting point of about 420° C.). The protective coating 28—if comprised of zinc or tin (tin has a melting point of about 232° C.)—would also melt around this time. If the protective coating 28 is comprised of any of the aforementioned metal oxides, however, it would not necessarily melt due to the relatively high melting points of those oxides. Instead, on account of its relatively thin character and non-self-healing nature, the protective coating 28 would fracture and disintegrate under the mechanical and thermal stresses imparted by the clamping pressure of the electrodes 82, 84 and the welding current flow.

Eventually, as passage of the welding current continues, the aluminum alloy base substrate 72 melts at the weld site 14 to form a molten aluminum alloy weld pool 90. Prior and/or concurrent melting of the protective coating 28 (if a zinc or tin coating) on the aluminum alloy base substrate 72 or disruption of the of the protective coating 28 (if a metal oxide conversion coating) on the aluminum alloy base substrate 72 allows the molten aluminum alloy weld pool 90 to absorb molten zinc from the steel workpiece 10 and to directly contact the interior side 64 of the steel base substrate 62. This type of direct contact facilitates immediate wetting of the steel base substrate 62 with the molten aluminum alloy weld pool 90. Direct wetting of the steel base substrate 62 with the molten aluminum alloy weld pool 90 is believed to be a factor in improving the strength of the weld joint 92 ultimately formed between the two workpieces 10, 12, as already explained.

As the spot welding process proceeds, remnants from the formerly-present zinc coating 68 and protective coating 28 may alloy with or be engrossed by the molten aluminum alloy weld pool 90 and/or squeezed radially outward from the weld site 14 along the faying interface 24. Zinc and iron (the iron diffusing from the steel base 62 substrate), for example, will dissolve in the molten aluminum alloy weld pool 90. Tin generally will not. The metal oxides that may be found in the protective coating 28 may also be incorporated into the molten aluminum alloy weld pool 90 as particulate inclusions. None of these compositional fluctuations that may materialize in the molten aluminum alloy weld pool 90 are thought to be significantly detrimental to the strength and integrity of the weld joint 92.

Upon stoppage of the welding current, the molten aluminum alloy weld pool solidifies to form the weld joint 92, as illustrated generally in FIG. 9. The weld joint 92 may include an aluminum alloy weld nugget 94 and a Fe—Al intermetallic layer 96. The aluminum alloy weld nugget 94 extends into the aluminum alloy base substrate 72 to a distance that preferably ranges from about 20% to about 80% of the thickness 720 of the aluminum alloy base substrate 72. The Fe—Al intermetallic layer 96 is situated between the aluminum alloy nugget 94 and the steel base substrate 62. When measured in the direction of welding current flow, the Fe—Al intermetallic layer 96 is about 0.1 µm to about 5 µm thick, and preferably about 1 µm to about 2 µm thick, which is small enough to maintain quality weld strength between the two workpieces 10, 12.

Soon after stoppage of the welding current, the first and second welding electrodes 82, 84 are retracted from their engaged workpiece surfaces 18, 22, leaving behind impressed contact patches 98, 99 on the electrode-contacting surfaces 18, 22 of the steel and aluminum workpieces 10, 12, respectively. The stack-up 60 is then re-located between the first and second welding electrodes 82, 84 at a different weld site 14, or it is moved away so that another stack-up 60 can be located for spot welding. More spot welds are then formed in the same way.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding, the method comprising:
    providing an aluminum or an aluminum alloy workpiece that includes a faying surface and an electrode-contacting surface, wherein at least the faying surface has one or more aluminum oxide-based layers that overlie a bulk aluminum or aluminum alloy base substrate;
    replacing at least part of the aluminum oxide-based layer(s) at the faying surface of the aluminum or aluminum alloy workpiece with a protective coating, the protective coating being (1) a metal coating that has a lower melting point than that of aluminum or (2) a metal oxide conversion coating, wherein the metal oxide conversion coating is a coating of titanium oxide, a coating of zirconium oxide, a coating of chromium oxide, or a coating of silicon oxide;
    overlapping the faying surface of the aluminum or aluminum alloy workpiece with a faying surface of a steel workpiece to form a faying interface between the workpieces in which the protective coating of the faying surface of the aluminum or aluminum alloy workpiece is present at a weld site;
    passing an electrical current through the workpieces and across the faying interface at the weld site to initiate and grow a molten weld pool within the aluminum or aluminum alloy workpiece that wets an adjacent surface of the steel workpiece; and
    allowing the molten weld pool within the aluminum or aluminum alloy workpiece to solidify into a weld joint.

2. The method set forth in claim 1, wherein the protective coating is a coating of tin.

3. The method set forth in claim 2, wherein replacing at least part of the aluminum oxide-based layer(s) with the coating of tin comprises:
    immersing the aluminum or aluminum alloy workpiece in an alkaline solution that includes sodium stannate.

4. The method set forth in claim 1, wherein the protective coating is a coating of zinc.

5. The method set forth in claim 4, wherein replacing at least part of the aluminum oxide-based layer(s) with the coating of zinc comprises:
    immersing the aluminum or aluminum alloy workpiece in an alkaline solution that includes sodium zincate.

6. The method set forth in claim 1, wherein the metal oxide conversion coating is a coating of titanium oxide, and wherein replacing at least part of the aluminum oxide-based layer(s) with the coating of titanium oxide comprises:
    immersing the aluminum or aluminum alloy workpiece in a solution that dissolves the aluminum oxide-based layer(s);
    immersing the aluminum or aluminum alloy workpiece in a solution that includes a reactive organometallic titanium compound; and removing the aluminum or aluminum alloy workpiece from the solution that includes a reactive organometallic titanium compound and exposing the workpiece to air.

7. The method set forth in claim 1, wherein the metal oxide conversion coating is a coating of zirconium oxide, and wherein replacing at least part of the aluminum oxide-based layer(s) with the coating of zirconium oxide comprises:
immersing the aluminum or aluminum alloy workpiece in a solution that dissolves the aluminum oxide-based layer(s);
immersing the aluminum or aluminum alloy workpiece in a solution that includes a reactive organometallic zirconium compound; and
removing the aluminum or aluminum alloy workpiece from the solution that includes a reactive organometallic zirconium compound and exposing the workpiece to air.

8. The method set forth in claim 1, wherein the metal oxide conversion coating is a coating of chromium oxide, and wherein replacing at least part of the aluminum oxide-based layer(s) with the coating of chromium oxide comprises:
immersing the aluminum or aluminum alloy workpiece in a solution that dissolves the aluminum oxide-based layer(s); and
immersing the aluminum or aluminum alloy workpiece in a solution that includes a reactive chromium compound.

9. The method set forth in claim 1, wherein the metal oxide conversion coating is a coating of silicon oxide, and wherein replacing at least part of the aluminum oxide-based layer(s) with the coating of silicon oxide comprises:
immersing the aluminum or aluminum alloy workpiece in a solution that dissolves the aluminum oxide-based layer(s); and
immersing the aluminum or aluminum alloy workpiece in a solution that includes a reactive silicon dioxide compound.

10. The method set forth in claim 1, wherein the steel workpiece is a galvanized steel workpiece.

11. A method of resistance spot welding, the method comprising:
providing a workpiece stack-up that includes a steel workpiece and an aluminum or an aluminum alloy workpiece, the workpiece stack-up having a faying interface between the steel workpiece and the aluminum or aluminum alloy workpiece at a weld site, the aluminum or aluminum alloy workpiece comprising a protective coating at the faying interface that is either (1) a metal coating that has a lower melting point than that of aluminum or (2) a metal oxide conversion coating, wherein the metal oxide conversion coating is a coating of titanium oxide, a coating of zirconium oxide, a coating of chromium oxide, or a coating of silicon oxide;
passing an electrical current through the workpiece stack-up and across the faying interface at the weld site to initiate and grow a molten weld pool within the aluminum or aluminum alloy workpiece that wets an adjacent surface of the steel workpiece; and
allowing the molten weld pool within the aluminum or aluminum alloy workpiece to solidify into a weld joint.

12. The method of claim 11, wherein the protective coating is substituted for an aluminum oxide-based layer or layers that overlie a bulk aluminum or aluminum alloy base substrate.

13. The method set forth in claim 11, wherein the protective coating is a coating of zinc or a coating of tin.

14. The method set forth in claim 11, wherein the steel workpiece is a galvanized steel workpiece.

15. A method of resistance spot welding, the method comprising:
providing an aluminum alloy workpiece that includes a bulk aluminum alloy base substrate and one or more aluminum oxide-based layers that cover the bulk aluminum alloy base substrate;
replacing at least a portion of the aluminum oxide-based layer(s) with a protective coating, the protective coating being (1) a metal coating that has a lower melting point than that of aluminum or (2) a metal oxide conversion coating, wherein the metal oxide conversion coating is a coating of titanium oxide, a coating of zirconium oxide, a coating of chromium oxide, or a coating of silicon oxide;
assembling the aluminum alloy workpiece and a steel workpiece into a workpiece stack-up in which the aluminum alloy workpiece and the steel workpiece overlap to form a faying interface at a weld site, the aluminum alloy workpiece having an electrode-contacting surface and a faying surface when assembled into the workpiece stack-up, and wherein the protective coating of the aluminum alloy workpiece is present and overlies the bulk aluminum alloy base substrate at each of the electrode-contacting surface and the faying surface at the weld site; and
spot welding the workpiece stack-up at the weld site to form a weld joint at the faying interface of the aluminum alloy and steel workpieces, the spot welding comprising passing an electrical current through the workpiece stack-up and between opposed first and second welding electrodes to form a molten aluminum alloy weld pool within the aluminum alloy workpiece that wets the steel workpiece and, upon stoppage of the welding current, solidifies into a weld joint that loins the steel and aluminum alloy workpieces together.

16. The method set forth in claim 15, wherein the protective coating is a coating of zinc or a coating of tin.

17. The method set forth in claim 15, wherein the weld joint comprises an aluminum alloy weld nugget and a Fe—Al intermetallic layer situated between the aluminum alloy weld nugget and a base steel substrate of the steel workpiece, the Fe—Al intermetallic layer having a thickness that ranges from about 0.1 μm to about 5 μm.

* * * * *